Feb. 9, 1937.　　　M. H. HANSEN　　　2,069,757
WEIGHING SCALE
Filed March 14, 1935　　　3 Sheets-Sheet 1

INVENTOR
Marius H. Hansen
By Parker, Carlson, Pitzner & Hubbard
ATTORNEYS

INVENTOR
Marius H. Hansen
By Parker, Carlson, Pitzner & Hubbard
ATTORNEYS

Feb. 9, 1937.  M. H. HANSEN  2,069,757
WEIGHING SCALE
Filed March 14, 1935   3 Sheets-Sheet 3
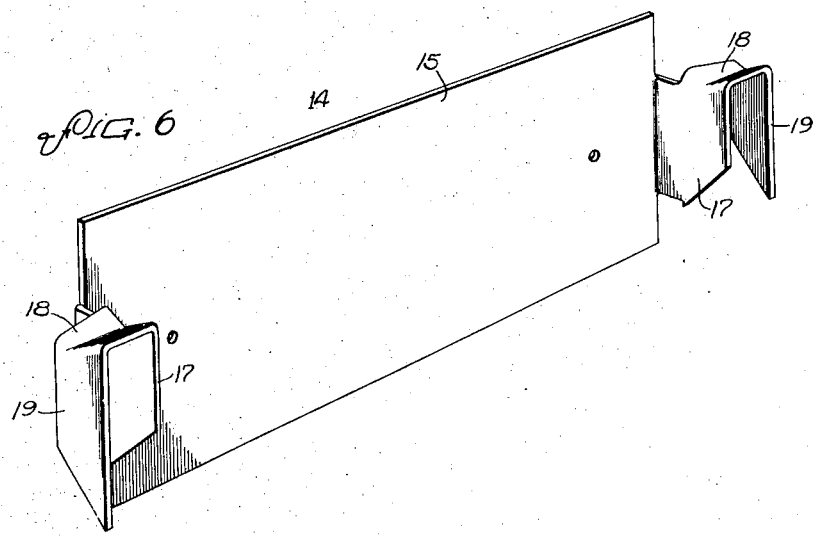
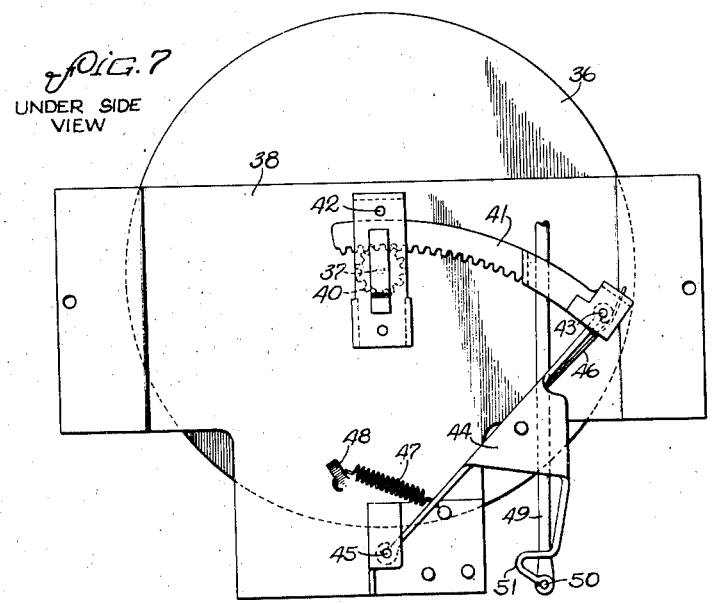
INVENTOR
Marius H. Hansen
By Parker, Carlson, Pitzner & Hubbard
ATTORNEYS Patented Feb. 9, 1937

2,069,757

UNITED STATES PATENT OFFICE 2,069,757

WEIGHING SCALE

Marius H. Hansen, Chicago, Ill., assignor to Hanson Scale Company, Chicago, Ill., a corporation of Illinois Application March 14, 1935, Serial No. 11,016

5 Claims. (Cl. 265—68)

This invention relates particularly to personal scales. Commercial considerations make low cost essential, but it is important that the construction, although inexpensive, be strong, durable and capable of accurate operation. It is also desirable that such scales be readily portable and that they shall take up little room, and hence they should be light and compact. The aim of the present invention is to produce a scale possessing all of these desirable characteristics. Lightness and cheapness have been attained by the use of sheet metal as far as possible; strength, durability and ease of assembly have been assured by devising certain units hereinafter described; compactness has resulted from placing the dial and pointer mechanism beneath the platform, instead of at one end of or above the platform, and by making the scale mechanism of such small dimensions that it can lie wholly below the platform and inside the perimetral outline of the latter; and accuracy in operation has been attained by reason of the strong and durable character of the construction, the proper alinement and spacing of the bearings, and the placing of the pointer on the supporting framework instead of on the platform.

In the accompanying drawings:

Fig. 6 is a perspective view of the front-bearing unit.

Fig. 7 is an underside view of the dial unit.

Figure 1:
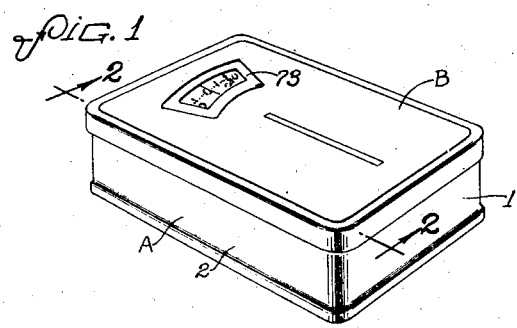
Figure 1 is a perspective view of a weighing scale embodying the features of my invention.

The mechanism of the scale is enclosed within a shallow rectangular box or casing A. The platform B is of approximately the same perimetric outline as the casing A and constitutes a cover for the latter.

The casing A comprises a perimetral wall member forming the front end and two sides of the casing and made of an integral piece of sheet metal. In the drawings, the numeral 1 denotes the front end wall. The numeral 2 indicates the side wall. The rear end wall is formed of a sheet metal unit, illustrated in Fig. 3, which consists of the rear wall 3 and two forwardly extending webs 4 adapted to lie alongside the side walls 2 and be secured thereto by means of rivets 5, or in any other preferred manner. The rear wall unit further comprises a bottom plate 6 adapted to overlie and be welded to inwardly extending flanges 7 on the side walls 2. The bottom of the casing A is completed by a plate 8 having at its rear edge two lugs 9 to engage the forward edge of the plate 6. The front end of the plate 8 is supported by means of ears 10 formed at the front corners of the plate 8 and bent to overlie the ends of an inwardly extending flange 11 on the front wall 1.

Figure 5:
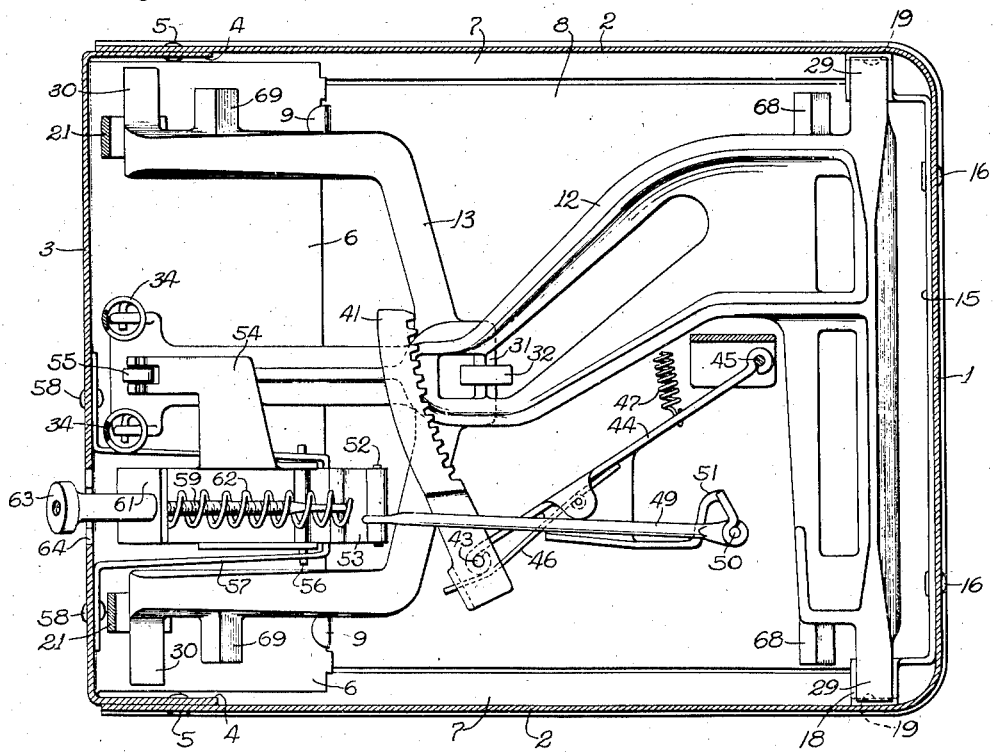
Fig. 5 is a section on line 5—5 of Fig. 2.

The scale mechanism comprises two levers 12 and 13 (Fig. 5). To provide bearings to support the lever 12 I attach to the inner side of the front wall 1 the integral unit 14 shown in Fig. 6. Said unit comprises a plate 15 adapted to lie against the inner side of the front wall 1 and be secured thereto in any preferred way, as by means of rivets 16 (Fig. 5). The unit 14 further comprises two rearwardly extending webs 17, each of which is bent to form a V-shaped bearing 18 and a vertically extending flange 19, the latter being adapted to lie alongside of the side walls 2 and be spot-welded thereto, as at 20, so as to afford a point of support close to the bearing 18. It will be seen that by forming the bearings 18 as a part of a unit, such as the unit 14, said bearings can be readily formed in perfect alinement with each other and at the desired distance apart, and may be easily secured in proper position within the casing A and with the necessary strength and rigidity.

The lever 13 is pivotally supported within the rear portion of the casing A by means of two hangers 21 (Figs. 2 and 3), each hanger being formed of an integral piece of sheet metal. The lower end of the hanger is bent to form a V-shaped bearing 22 for the lever 13. The upper end of the hanger is bent to form an angular inwardly extending portion 23, an upwardly extending portion 24 and a rearwardly and downwardly extending portion 25. On the upper edge of the rear wall 3 is an inwardly extending flange 26, and on the forward edge of said flange is an upwardly extending flange 27 having notches 28 which constitute bearings for the upper ends of the hangers 21. The distance between the portion 23 and the lower end of the portion 25 is less than the height of the flange 27 to the bottom of the notch 28; consequently, the hanger 21 cannot be disengaged from the flange 27 by a direct forward movement of the upper end of the hanger. The portion 23 prevents upward displacement of the hanger, and the side walls of the notch 28 prevent sidewise displacement of the hanger. In the operation of assembling the scale, the hanger 21 is engaged with the flange 27 by a downward swinging movement of the hanger into the position shown in Fig. 2.

The front end of the lever 12 has two knife-edge bearings 29 (Figs. 2, 4, and 5) adapted to stand upon the V-shaped bearings 18. The lever 13 is in the form of a yoke, the arms of which have knife-edge bearings 30 adapted to stand upon the V-shaped bearings 22 of the hangers 21. The forward end of the lever 13 is suspended from a knife-edge bearing 31 at approximately the midpoint of the lever 12 by means of a loop 32, said loop supporting a knife-edge bearing 33 on the lever 13.

Figure 3:
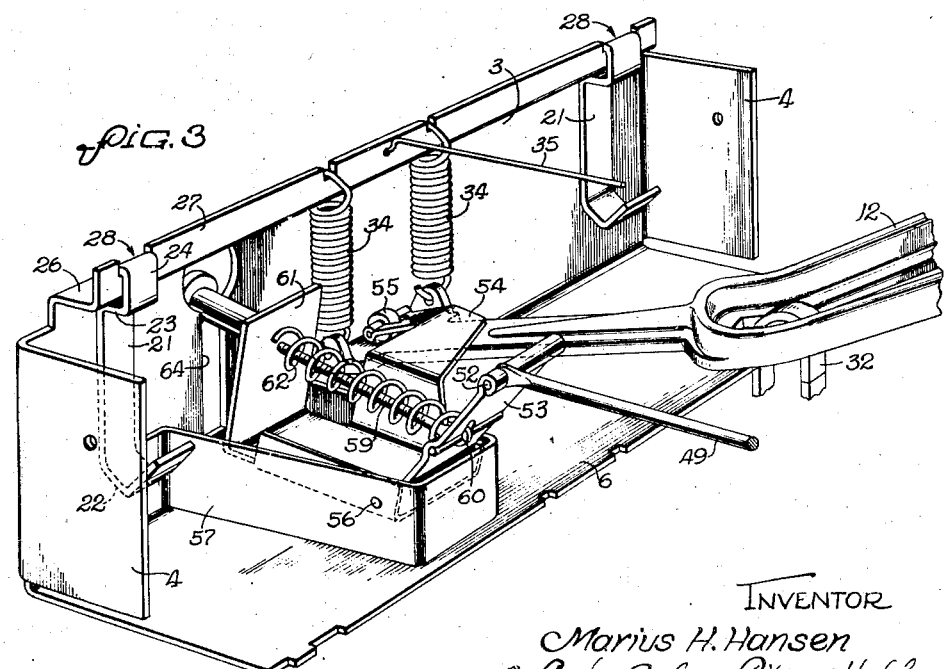
Fig. 3 is a perspective view of the rear-wall unit and certain parts associated therewith.

The rear end of the lever 12 is supported by two resistor springs 34 which are suspended from the flange 27, as shown in Fig. 3.

The scale mechanism comprises a pointer 35 (Figs. 2 and 3) which is fixed to the flanges 26 and 27 and which overlies the peripheral portion of a rotatable circular dial 36. The dial 36 is fixed to a vertical shaft 37 (Fig. 7) which is journaled in bearings carried by a plate 38 that extends across the casing A and is secured at its ends to inwardly extending flanges 39 (Figs. 2 and 4) on the side walls 2. Fixed to the shaft 37 is a pinion 40 (Figs. 2 and 7) that meshes with a curved rack 41. The rack is prevented from moving edgewise out of mesh with the pinion by means of a stud 42. The rack 41 is pivoted at 43 to a lever 44 which is pivoted at 45 to the plate 38. A spring 46 carried by the lever 44 tends to cause pivotal movement of the rack 41 on the axis 43 toward the pinion 40 and thus holds the rack in contact with the pinion.

A spring 47 attached to the lever 44 and anchored to the plate 38 at 48 tends to swing the lever 44 in the direction to rotate the dial 36 to register the weight. The action of the spring 47 is controlled by the scale lever 12 through a linkage comprising a link 49 pivoted at 50 to a bracket 51 on the lever 44. The rear end of the link 49 is pivoted at 52 to a bell crank arm 53 Connected with the bell crank arm 53 is an arm 54 which is bent to overlie the rear end of the lever 12 and which carries an antifriction roller 55 that rests upon the rear end of said lever. The bell crank lever 53, 54 is pivoted at 56 in a bracket 57 which is riveted to the rear wall 3 at 58. It will be seen that when the arm 12 swings downwardly against the tension of the resistor spring 34, the spring 47 is permitted to move the rack 41 clockwise (as viewed in Fig. 5), thus imparting clockwise rotation to the dial 36, the extent of such rotation being proportional to the extent of downward movement of the lever 12.

In order to adjust the zero position of the dial 36 with reference to the pointer 35, I provide an adjustable connection between the bell crank arms 53 and 54. For this purpose the arm 53 is pivoted with relation to the arm 54 at the axis 56, but is normally held immovable with relation to the arm 54 through the medium of a screw 59 which is connected to the arm 53 at 60 (Fig. 3) and which extends freely through a bracket 61 on the arm 54. An expansive coiled spring 62 is interposed between the arm 53 and the bracket 61. On the rear end of the screw 59 is a nut 63 which may be turned by hand. The spring 62 normally holds the arm 53 at a fixed distance from the bracket 61, but said distance may be adjusted when necessary to bring the zero point on the dial 36 directly beneath the pointer 35, by turning the nut 63 in the appropriate direction. The nut 63 extends freely through a slot 64 in the rear wall 3.

When the scale is being assembled at the factory, the movement of the dial is brought into proper relation to the movement of the platform by suitably bending the bracket 51 so as to obtain the right distance between the points 45 and 50. Access to the bracket 51 for the purpose of bending it is attained through the bottom of the casing A before the bottom plate 8 is secured in place.

Figure 2:
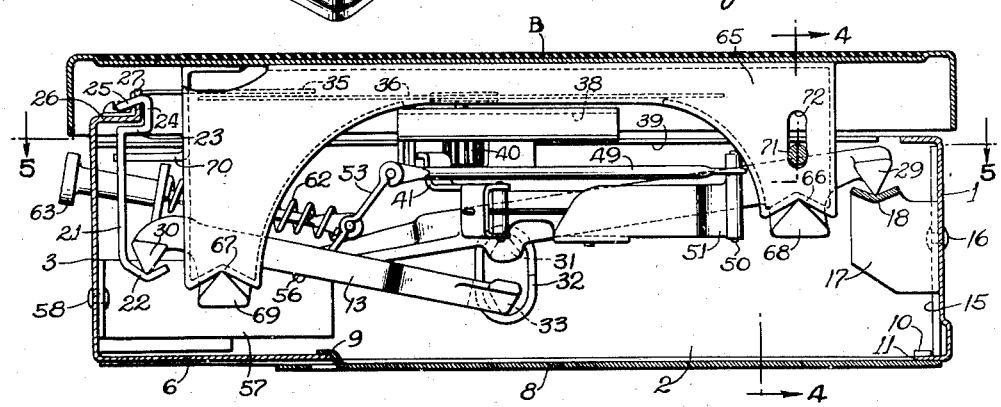
Fig. 2 is a section on line 2—2 of Fig. 1.
Figure 4:
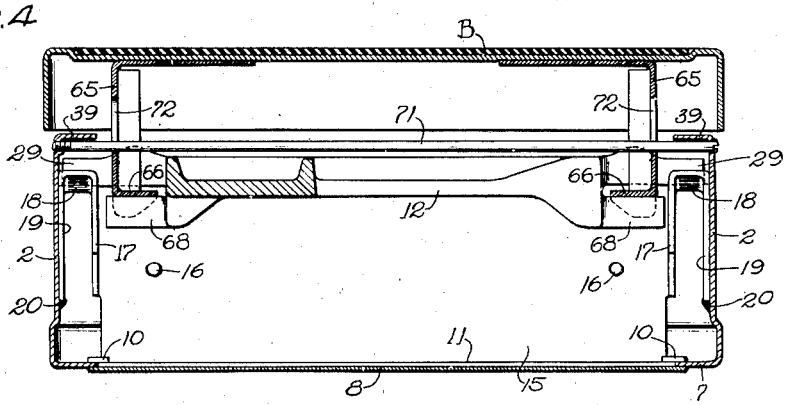
Fig. 4 is a section on line 4—4 of Fig. 2.

The platform B has fastened to its underside two sheet metal brackets 65 (Figs. 2 and 4). These brackets are bent to provide two front V-shaped bearings 66 and two rear V-shaped bearings 67. The bearings 66 are adapted to rest upon knife-edge bearings 68 (Figs. 2, 4, and 5) formed on the lever 12 near the front end thereof. The bearings 67 rest upon knife-edge bearings 69 (Figs. 2 and 5) that are formed on the rear portion of the lever 13.

The platform B is secured against separation from the scale mechanism by means of two angular lugs 70 (Fig. 2) formed on the rear ends of the brackets 65, said brackets extending beneath the flange 26 and thus serving to prevent objectionable upward movement of the rear end of the platform. The front end of the platform is held against objectionable upward displacement by means of a cross pin 71 (Figs. 2 and 4), one end of which is threaded into an opening in one of the side walls 2 and the other end of which lies in an opening in the opposite side wall 2. The pin 71 extends loosely through vertically elongated openings 72 in the brackets 65. The openings 72 are of sufficient length to permit the platform B to descend in the weighing operation, but in conjunction with the pin 71 they prevent the front end of the platform from being removed from the body of the scale and also prevent forward and backward movement of the platform.

In that portion of the platform B which overlies the pointer 35 is formed an arcuate opening 73 (Fig. 1) which is glazed with any suitable material, thus constituting a window through which the position of the dial 36 with relation to the pointer 35 may be observed.

In use, the platform B is subjected to the weight of the person or object to be weighed, the pressure upon the platform being transmitted through the bearings 66, 68 and 67, 69 to the levers 12 and 13. The rear end of the lever 12 is thereby caused to descend against the tension of the resistor springs 34. The descent of the lever 12 permits the spring 47 to swing the arm 44 and the rack 41 in the clockwise direction, thus turning the dial 36 clockwise to carry the graduations on the dial beneath the pointer 35, whereby the weight is indicated. As explained, the dial mechanism is not positively connected to the scale levers, but on the contrary, the roller 55 is merely caused by the spring 47 to follow the lever 12 in the downward movement of the latter. Consequently, the dial mechanism is protected from injury through violent movements imparted inadvertently or mischievously to the platform.

It will be seen that no part of the dial mechanism is carried by the platform, the entire dial mechanism being mounted in and upon the casing A. Consequently, no inaccuracy is introduced into the registration through any slight lateral displacement of the platform.

By mounting the dial mechanism in and upon the casing A and beneath the platform B, a very compact construction is attained.

The manufacture of the scale in sections or units, such as the front bearing unit 14 (Fig. 6), the rear bearing unit illustrated in Fig. 3, and the dial unit shown in Fig. 7 greatly facilitates the assembly of the parts and thus enables me to produce a strong, durable and accurate scale at a relatively low cost.

I claim as my invention:

1. In a weighing scale, a casing, an integral unit formed of sheet metal and comprising a vertical plate attached to the casing, and two vertical webs extending at an angle to the plate, one at each end of the plate, each web being bent at its upper portion to form a bearing and also bent to form a vertical attaching portion close to the bearing, said attaching portions being secured to the casing, each bearing being supported between one of said webs and the adjacent attaching portion.

2. A weighing scale having, in combination, a box-like casing, a platform overlying the casing, scale mechanism and indicating mechanism supported by the casing below the platform, members on the platform which rest on the scale mechanism, said members having vertically elongated openings, and a pin extending across and secured to the casing and extending through said openings to secure the platform to the casing and prevent torsional displacement of the platform.

3. In a weighing scale, a rectangular casing, an integral unit formed of sheet metal and comprising an elongated attaching plate secured to one wall of the casing, a bearing formed at each end of the plate adjacent to two opposite walls of said casing, and an attaching portion close to each bearing, each attaching portion being secured to one of said opposite walls, whereby said bearings are spaced a predetermined distance apart along the first mentioned wall and secured to said other walls in alinement with each other at a predetermined height.

4. A scale lever hanger formed of an integral piece of sheet metal bent to provide at its upper end an angular suspending member and an angular displacement-preventing portion beneath and adjacent to said suspending member, said member and portion being spaced apart to receive a support, and bent at its lower end to provide a lever bearing.

5. In a weighing scale, a sheet-metal member bent to provide a horizontal flange having a vertical flange rising therefrom, the vertical flange having a notch in its upper edge, a scale-lever hanger formed of sheet metal bent to provide an angular suspending member lying in said notch, an angular displacement-preventing portion underlying the horizontal flange, and a scale lever bearing at its lower end.

MARIUS H. HANSEN.